(12) United States Patent
Hatfield et al.

(10) Patent No.: US 7,784,431 B2
(45) Date of Patent: Aug. 31, 2010

(54) ANIMAL STANCHION WITH SELECTIVELY RELEASABLE FEATURE

(76) Inventors: John B. Hatfield, 1823 Shoestring Rd., Gooding, ID (US) 83330; David W. Hatfield, 1823 Shoestring Rd., Gooding, ID (US) 83330; J. Deven Hatfield, 1823 Shoestring Rd., Gooding, ID (US) 83330; Jason M. Hatfield, 1823 Hatfield Rd., Gooding, ID (US) 83330

( * ) Notice: Subject to any disclaimer, the term of this patent is extended or adjusted under 35 U.S.C. 154(b) by 1212 days.

(21) Appl. No.: 11/351,659

(22) Filed: Feb. 9, 2006

(65) Prior Publication Data

US 2006/0174844 A1     Aug. 10, 2006

Related U.S. Application Data

(60) Provisional application No. 60/651,945, filed on Feb. 9, 2005.

(51) Int. Cl.
*A01K 15/04* (2006.01)
(52) U.S. Cl. ........................ 119/741; 119/739
(58) Field of Classification Search ......... 119/739–741, 119/745, 746
See application file for complete search history.

(56) References Cited

U.S. PATENT DOCUMENTS

| | | | |
|---|---|---|---|
| 1,142,246 A | 6/1915 | Gagan | |
| 1,352,392 A * | 9/1920 | Stevenson | 256/21 |
| 1,451,402 A * | 4/1923 | Neller | 119/745 |
| 1,780,367 A * | 11/1930 | Siebenmorgen | 119/741 |
| 1,886,741 A * | 11/1932 | Rickey | 119/745 |
| 1,910,666 A | 5/1933 | Babson | |
| 1,996,196 A | 4/1935 | Ferris | |
| 2,642,037 A | 6/1953 | Merrill | |
| 3,421,478 A | 1/1969 | Warmerdam | |
| 3,726,257 A | 4/1973 | Anderson | |
| 3,802,392 A | 4/1974 | Anderson | |
| 3,986,481 A | 10/1976 | Gloggler et al. | |
| 4,037,566 A | 7/1977 | Albers | |
| 4,051,813 A | 10/1977 | Albers | |
| 4,055,149 A | 10/1977 | Haiges | |
| 4,116,166 A | 9/1978 | Gofflot | |
| 4,185,592 A | 1/1980 | Albers, Sr. | |
| 4,377,131 A | 3/1983 | Vandenberg et al. | |
| 4,457,265 A | 7/1984 | Anderson | |
| 4,476,815 A | 10/1984 | Albers, Sr. | |
| 4,495,897 A | 1/1985 | Albers, Sr. | |
| 4,574,741 A | 3/1986 | Mahler | |
| 4,579,084 A | 4/1986 | McCan et al. | |
| 4,599,972 A | 7/1986 | Kilburn | |
| RE32,728 E | 8/1988 | Albers, Sr. | |
| 4,867,105 A | 9/1989 | Hatfield | |
| 4,930,452 A | 6/1990 | DaSilveira | |
| 4,976,224 A | 12/1990 | Hatfield | |

(Continued)

*Primary Examiner*—Kimberly S Smith
(74) *Attorney, Agent, or Firm*—Frank J. Dykas; Dykas, Shaver & Nipper, LLP

(57) ABSTRACT

An animal stanchion having fixed stanchion structure and a pivotal release stanchion laterally spaced apart to define a head opening. The animal stanchion further comprises an upper top control rail which is configured to interact with a latch to selectively hold and release various portions of the pivot rod from connection with the latch. This device further comprises a plurality of individual locking brackets which are configured to interact with handle catch devices so as to hold various devices within their designated location within the device.

17 Claims, 6 Drawing Sheets

U.S. PATENT DOCUMENTS

| | | |
|---|---|---|
| 5,069,163 A | 12/1991 | Moreau et al. |
| 5,109,802 A | 5/1992 | Priefert |
| 5,111,770 A | 5/1992 | Weelink |
| RE34,232 E | 4/1993 | Da Silveira |
| 5,226,387 A | 7/1993 | Anderson |
| 5,289,798 A | 3/1994 | Lock |
| 5,309,869 A * | 5/1994 | Albers, Jr. .................. 119/735 |
| 5,373,813 A | 12/1994 | Da Silveira |
| 5,392,731 A | 2/1995 | Hoppman et al. |
| 5,564,368 A | 10/1996 | Hepp et al. |
| 5,694,887 A | 12/1997 | Vandenberg |
| 5,967,091 A | 10/1999 | Zartman |
| 6,026,766 A | 2/2000 | Albers, Jr. |
| 6,651,593 B2 * | 11/2003 | Fornes ........................ 119/750 |
| 6,863,031 B1 * | 3/2005 | DaSilveira .................. 119/746 |
| 7,353,778 B2 * | 4/2008 | Albers, Jr. .................. 119/740 |

* cited by examiner

ANIMAL STANCHION WITH SELECTIVELY RELEASABLE FEATURE

CROSS-REFERENCE TO RELATED APPLICATIONS

This application claims the priority date of the provisional application entitled ANIMAL STANCHION WITH SELECTIVELY RELEASABLE FEATURE filed by the aforementioned inventors on Feb. 9, 2005 with application Ser. No. 60/651,945.

FIELD OF THE INVENTION

The invention relates generally to an apparatus for feeding or holding animals such as cattle and more particularly to linearly arranged and aligned cattle stanchions that have opened, closed and downed animal positions.

BACKGROUND OF THE INVENTION

Safety stanchions are used to selectively hold and release animals such as cattle during a variety of activities. Such stanchions are typically found in feed lots, ranching operations, dairies and virtually any other activity where animals such as cattle are tended. For example, in the dairy industry stanchions are used to hold and selectively release cows during activities such as feeding, milking, veterinary care, pregnancy testing and even calving.

Stanchions typically have several common characteristics. First, they are usually assembled in long strings of individual stanchions connected between top and bottom rails and set in concrete. Commonly, a stanchion is used in conjunction with a feed bunker, and the stanchion is utilized to hold the head of the cow in the desired position and location with the bunker.

In the typical prior art cattle stanchion, the head opening for the animal is usually defined between a stationary, vertically-oriented rail and a pivotal release rail. This pivotal release rail, when tilted in one direction, enlarges the upper part of the opening so that the animal can put its head through the opening. As the animal lowers its head to reach the feed, the pivotal release rail pivots to a more vertical position, where it automatically latches in place to assume the closed position. In the closed position, the animal cannot withdraw its head from the stanchion and is effectively held in place. In some instances, when the animals fall down, become distressed or are knocked down by an adjacent animal, this pivoting stanchion can be individually released to what is called a "downed cow" position by releasing a latch and allowing the release stanchion portion to pivot in the opposite direction to enlarge the opening in the lower portion of the head opening. This enables the downed animal to be able to remove its head from its position within the stanchion.

Individual stanchions may be arranged in various configurations for various reasons. Long strings of these stanchions may be linearly arranged with a control means on one end which allows the stanchions to be selectively locked and released from a singular location. Arranging these stanchions in long strings allows for more equal animal access to the feed bunker for equal portion sizing, holding the animals close together where they are most comfortable since they are instinctually herd animals, as well as to immobilize a group of animals for veterinary care such as dehorning, vaccinating, pregnancy testing and a host of other types of uses.

Control of the latch mechanisms in such an arrangement has traditionally been accomplished by means of a control rod, which is mounted atop the top rail. These control rods contain one of two cooperating parts of a latch mechanism of the release stanchion, with the other cooperating part of the latch mechanism attached to the top of the pivotal release stanchion. This configuration typically allows for the arrangement of the device into four types of positions. A locked open position where the release stanchion is positioned so as to enable an animal to insert its head and then lower its head, swinging the release stanchion out of the way as it reaches for feed. When the animal wishes to exit the stanchion it may do so by raising its head, moving the swinging portion of the stanchion open and then removing its head from the device. An open to automatic closed position when the animal lowers its head the release stanchion locks in place in the closed position to automatically lock the animal in the stanchion. A manually operable downed cow position wherein the rancher or dairyman can release an individual animal that has fallen down by manually pivoting the release stanchion to the downed cow position. A locked closed position to lock all of the stanchions in a closed position to either keep the animals from inserting their heads through the stanchions, or to keep all of the animals contained within the stanchions.

The problem in the prior art is that since these devices must be stoutly built to restrain the animals, strings of cattle stanchions are fabricated of metal, usually steel, and such materials expand and contract significantly with changes in temperature. Since these continuous strings of cattle stanchions can literally include hundreds of stanchions, all in one continuous row, the amount of expansion and contraction is amplified and can be considerable. This expansion and contraction of the control rod can cause the latching mechanisms of the stanchions to be offset from their interconnection points with the control rod. As a result, the control rod will align with the stanchion couplers at one end of the device but not at the other. When this occurs various manual adjustments must be made to the control mechanisms so as to ensure that proper operation. However, as the temperature changes these changes must be made again. In locations such as a desert clime where cold temperatures at night and hot temperatures in the day are common, such devices can require realignment even within the same day. Without such accommodation the stanchions will not lock and unlock as a group and must therefore be manually and individually locked and released. This takes a considerable amount of time as a person must walk to all of the potentially hundreds of stanchions and lock or unlock the stanchion gates. Furthermore, such an activity can be time consuming as the cattle may panic when approached by a human and move out of the stanchion.

Accordingly, it is an object of the present invention to provide a system for locking cattle stanchions that eliminates the current need to adjust the length of the control arm of a cattle stanchion so as to require the constant realignment of cooperating coupler portions of the latching mechanism with a control rod. Another object of the present invention is to provide a latching mechanism which is simple, effective and safe for the operator.

Additional objects, advantages and novel features of the present invention will be set forth in the summary of the invention which follows as well as the drawings and detailed description of the embodiment which is attached herewith. This description is not intended to be limiting in any way but merely illustrative of one embodiment of the invention set forth in the claims included herewith.

SUMMARY OF THE INVENTION

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention, which is measured by the claims, nor is it intended to be limiting as to the scope of the invention in any way.

The present invention is a control mechanism for use with animal stanchions such as cattle feeding operations and the like. In one embodiment of the invention a plurality of stanchions are linearly aligned. Each of these individual stanchions is made up of alternating combinations of fixed and pivoting stanchions which are laterally spaced apart and connected to a mounting connection device so as to allow one of said pivoting stanchions to be pivoted or moved between an open position, in which an upper part of a head opening is enlarged so as to enable an animal to place its head through the opening, and a closed position, in which the upper part of the opening is narrowed to hold the animal's head between the fixed and pivoting stanchions. In most embodiments the fixed and pivoting stanchion arms are held in a generally upright vertical position and orientation by upper and lower rails that extend in both directions along generally parallel horizontal planes. In an open position, the pivoting or release stanchion is generally configured so as to allow the release stanchion to fall into an open position when not locked or when a cow is not in a feeding position within the stanchion device. This open position is generally one where a larger opening exists at the top of the opening and a smaller opening exists at the bottom portion of the opening. In a closed position the pivoting or release stanchion arm is generally vertically aligned with the fixed stanchion arm. In some embodiments, a downed cow position is also available wherein the bottom portion of a pivoting stanchion arm can be moved and modified so as to enlarge the opening near the bottom rail of the trough so as to allow escape of the cow from such a situation.

The present invention provides a latching mechanism and system for such a device, which allows one party to selectively open and close all of the pivoting release arms in the stanchion assembly. The invention is made up of a pair of coordinating and compatible latching devices. One latching device is attached to a fixed structure such as a control sheath, and another compatibly configured portion is configured to connect with a portion of the pivoting or releasable pivot arm. The portion of the latching device that is connected to the arm is configured to interact with a portion of the latching structure which is connected to the control sleeve so as to selectively hold or release the pivoting stanchion arm as acted upon by the control means, such as a control rod.

The first latching device is made of at least one and preferably two pairs of latching fingers, or stop dogs. These devices are configured to interact with a portion of the latching device so as to hold the pivotable stanchion arm in an upright position so as to keep this device from moving. In the preferred embodiment of the invention, these latching fingers are interconnected to form a latch block, which is then configured to fit within a control sleeve. In a first position, the latching fingers or stop dogs extend beneath the bottom plane of the control sleeve, and in this position, interact with a portion of a bracket which is fixedly connected to the pivoting stanchion arm so as to hold the pivoting mechanism in an upright, locked position.

A control rod which is generally smooth in shape and has an asymmetrical preferably D-shaped cross section extends through the control sleeve. This control rod is positioned and held within the control sleeve in such a way so as to allow the rod to be moved both longitudinally as well as rotated within the sleeve. Preferably, the control rod is smooth in order to accommodate both of these features. When the control rod is rotated, the elongated portion of the cross section causes the latching fingers to be moved in such a way so as to cause the stanchion bracket to be released and the pivoting stanchion arm to be released. In the preferred embodiment of the invention, rotation of the control rod causes the latch block to which the fingers are connected, to be raised. This raising in turn causes the fingers to be raised, the connection between the bracket and the latch block to be broken, and the pivoting arm to be released. In other embodiments of the invention, the release of the fingers may be accomplished by pushing the fingers laterally rather than vertically, or by otherwise moving these latch fingers so as to release the bracket attached to the pivot arm.

When a user desires to lock the present invention, this can be done by simply rotating the control rod so as to cause the fingers to return to their desired position beneath the bottom plane of the control sleeve. In this position, the fingers can once again interact with the bracket and hold the pivoting stanchion arm in a desired, position and orientation. The present invention is a significant improvement over the prior art because the present invention has various modifications which overcome the problems related to expansion, contraction, and misalignment which exist in the prior art.

The control sleeve is made up of a plurality of individual sections, which are interconnected by fasteners that allow these sections to be maintained in a desired position and orientation. By dividing this sleeve into sections, the effects of thermal expansion can be limited and accounted for by varying the spacing between the sections. The control rod is all one piece, or combinations of longer pieces. However, because the control rod does not have any attachments connected to it, it is free to expand and contract with fluctuations in temperature, without affecting the configuration or the function of the device.

In addition to these features the present invention also provides a means and process whereby individual stanchion sections can be individually manually locked so as to prevent their opening regardless of the actions that take place with regard to the remaining portions of the control rod and the control sleeve. This is accomplished by inserting a manual catch pin through an elongated opening in the latch bracket and inserting this pin also through a rail bracket located on the top portion of the top rail. When the pivot stanchion is so connected, this stanchion will not open regardless of the actions of the control rod.

Still other features and advantages of the present invention will become readily apparent to those skilled in this art from the following detailed description describing only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
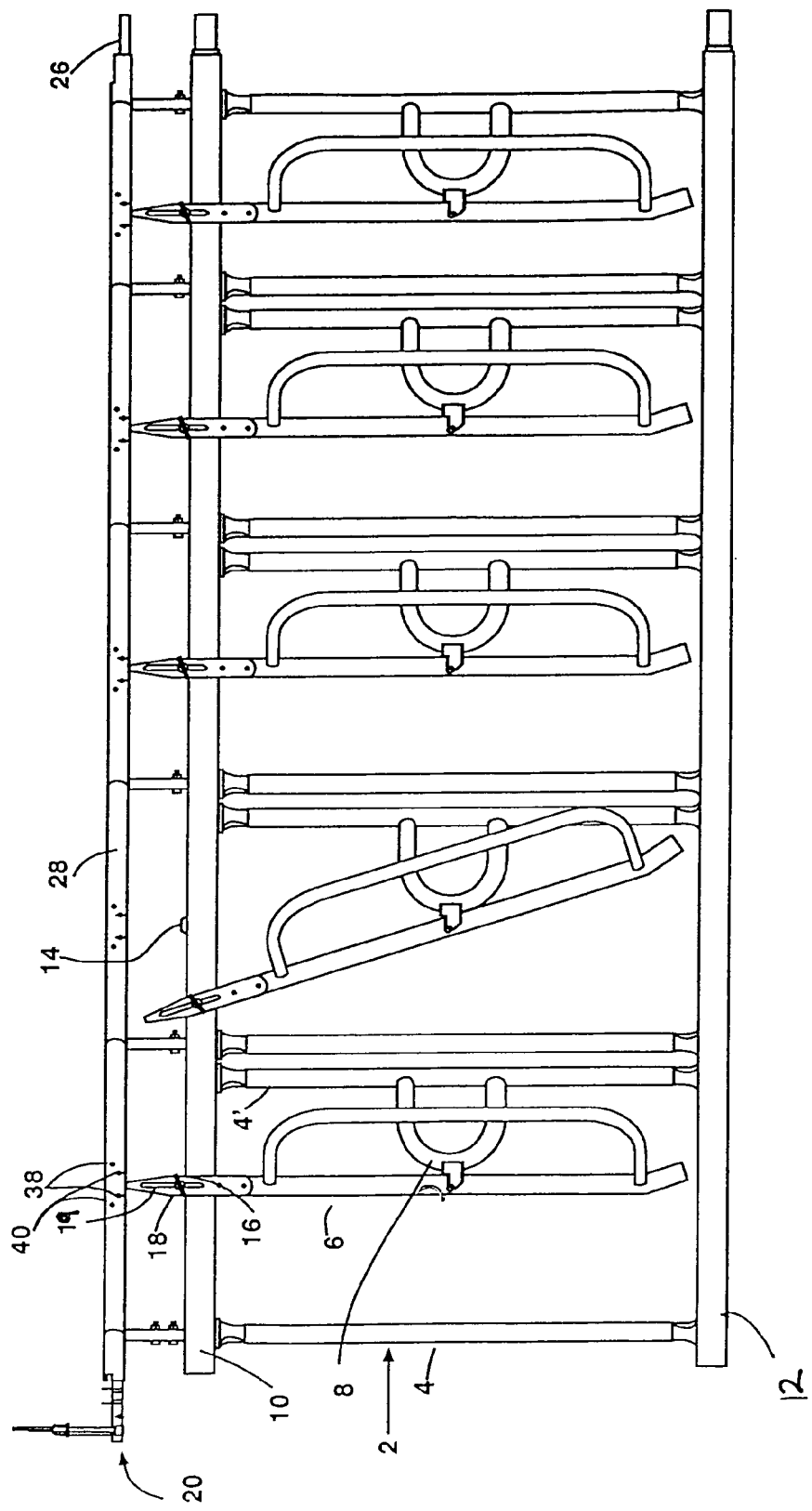
FIG. 1 is a front plan view of the present embodiment of the invention upon a series of animal stanchion.

While the invention is susceptible to various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is an improved cattle stanchion control locking system for selectively locking and releasing animals in an animal control stanchion. Various views of this embodiment are shown in the attached FIGS. 1-6. Referring now first to FIG. 1 a front plan view of the present invention and the stanchion upon which it is used is shown. A typical embodiment of a cattle stanchion is made up of a stanchion 2 having a fixed stanchion arm assembly 4, and a pivoting arm 6. This pivoting arm 6 is pivotally connected to a second fixed stanchion arm 4' through a mounting connection device 8. In the preferred embodiment of the invention, this mounting connection device 8 includes a piece of material that holds the pivot point of the pivoting arm 6 a pre-designated distance from the second fixed stanchion arm 4'. This positions the pivot point of the pivoting arm 6 at a desired horizontal position between the two fixed stanchions 4, 4'.

In the preferred embodiment, the fixed stanchion arms 4, 4' are positioned generally vertically upright between a top rail 10 and a lower rail 12. These top and lower rails are then connected to posts which are typically set in concrete or some other type of sturdy durable arrangement. As is shown, various assemblies of these stanchions 2 are placed in successive alignment along the top rail 10 and bottom rail 12. These successive combinations of items can lead to hundreds of stanchions all aligned in a generally longitudinal arrangement. In some embodiments, the lower end of these pivoting arms 6 is weighted to further assist in maintaining the pivoting arm in a desired upright position.

A stanchion latch bracket 18 is connected to the upper ends of the pivot arm 6. This latch bracket 18 defines a generally vertically extending slot 19 which is configured to receive a manual latch pin 16 therein. This manual latch pin 16 is configured for insertion through the slots 19 of the latch bracket 18 and through a rail bracket 14. When the manual latch pin 16 has been fully inserted through the rail bracket 14, the pivoting arm 6 is fully locked in this vertical closed position, and can only be opened by manually pulling the latch pin 16. When this pin 16 is positioned within the slots 19, but is not located within the rail bracket 14, the pivot arm 6 is free to move unless prohibited from doing so by the control system 20 of the present invention.

The control system 20 of the present invention is made up of a generally oblong or D-shaped control rod 26, which is placed within a three sided control rod casing or sleeve 28. This control rod sleeve 28 is made up of sections which are approximately equal in length to the distance between the two fixed stanchions 4 of adjoining stanchion assemblies, and which are held together by a fastening device preferably at least one rivet. These approximations of dimensions and type of fasteners are meant merely to be illustrative of one preferred embodiment of the device and are not meant to be limiting in any way.

Figure 2:
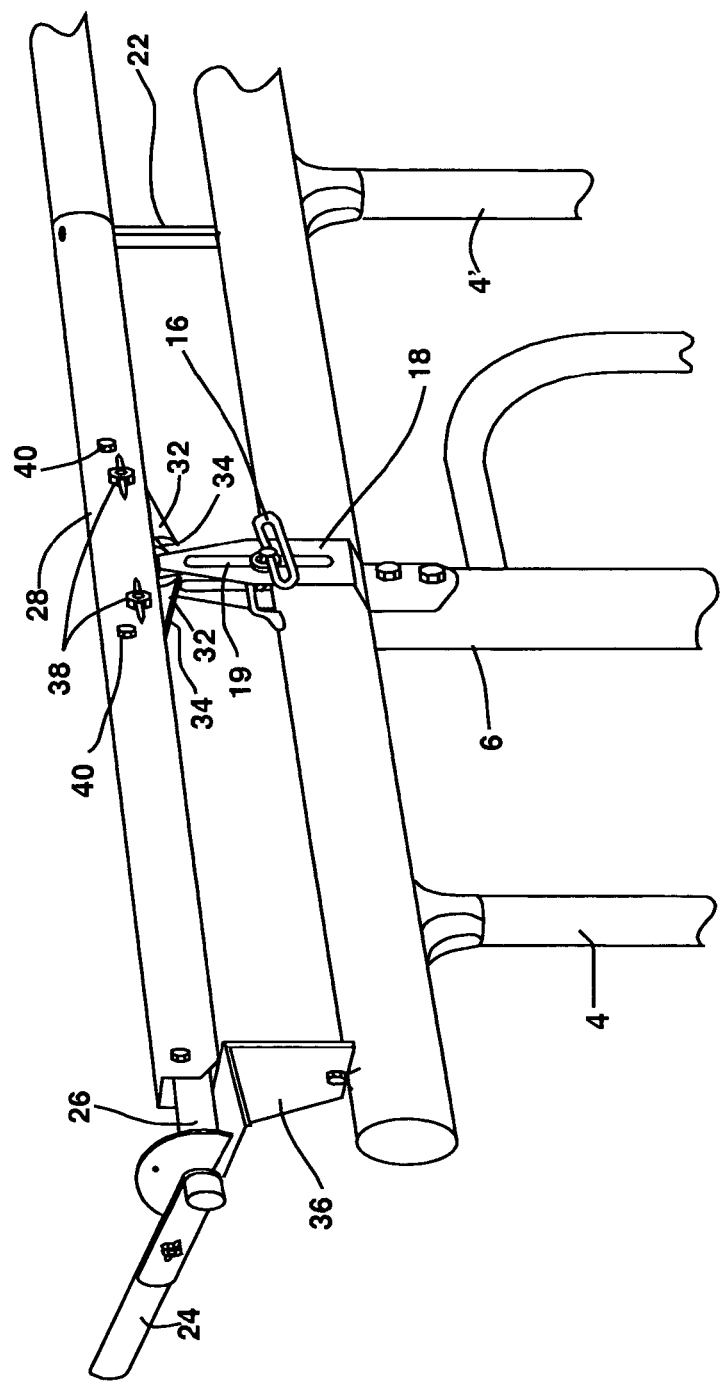
FIG. 2 is a detailed view of the connection between the release arm, the control rod and the top rail.
Figure 3:
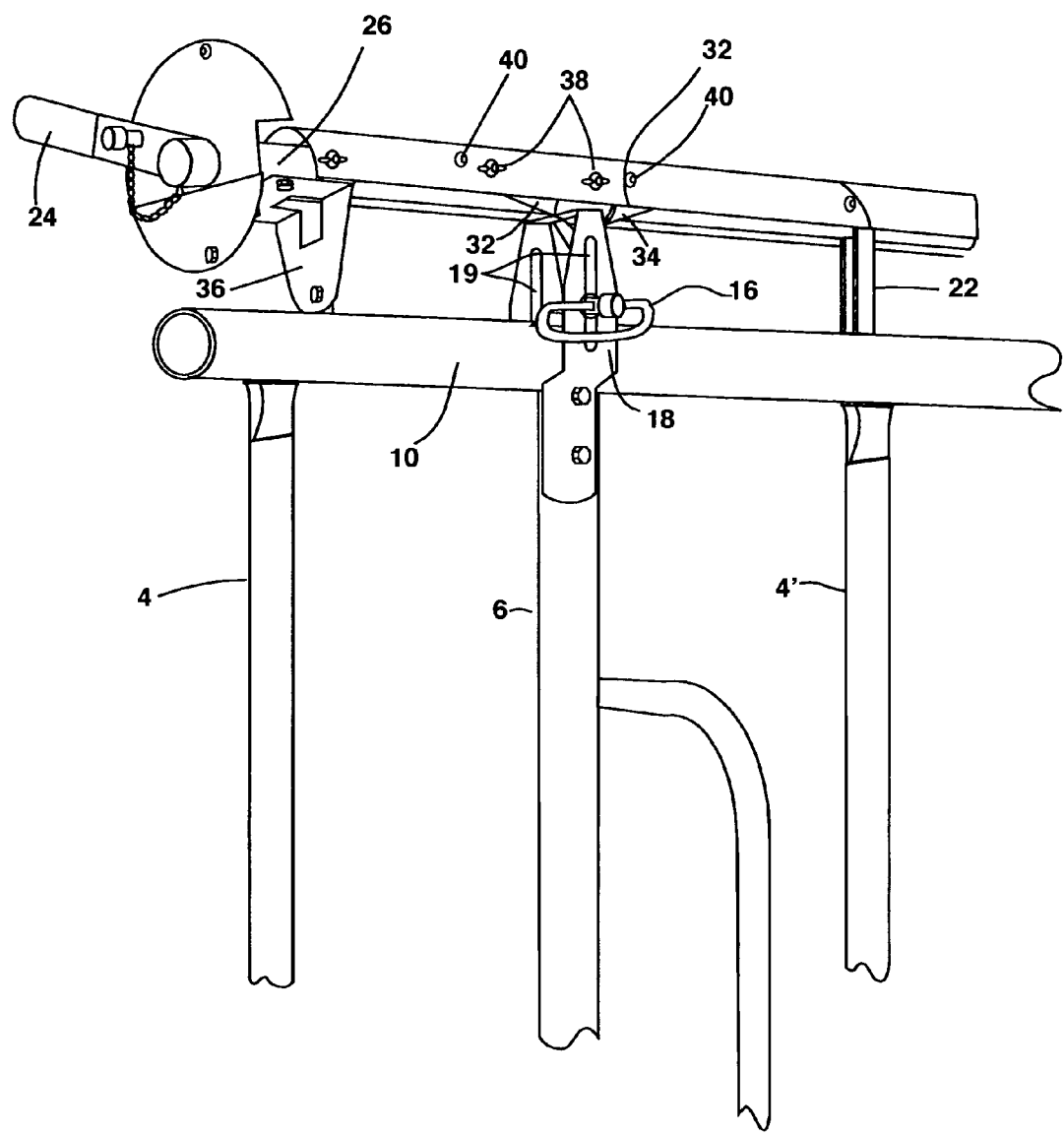
FIG. 3 is a detailed view of the connection between the latch device, the top rail portion and the upper portion of the pivot rod.
Figure 4:
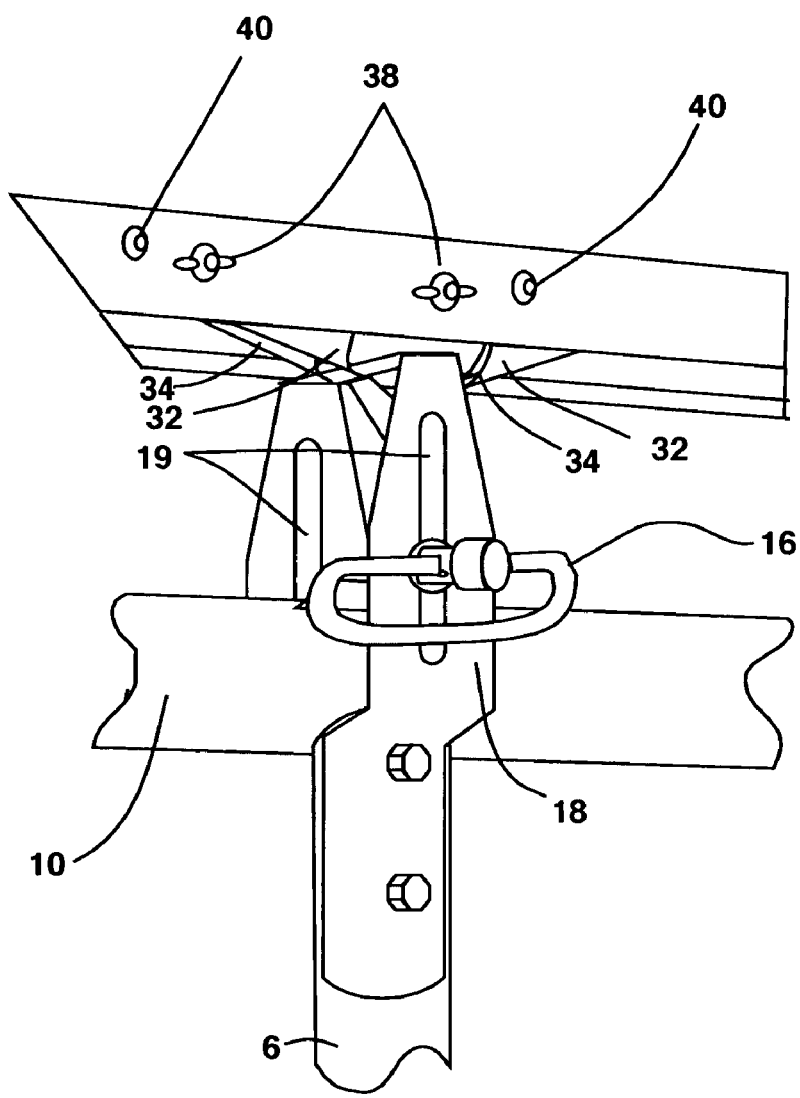
FIG. 4 is a bottom perspective view of the embodiment of the invention shown in FIG. 2.
Figure 5:
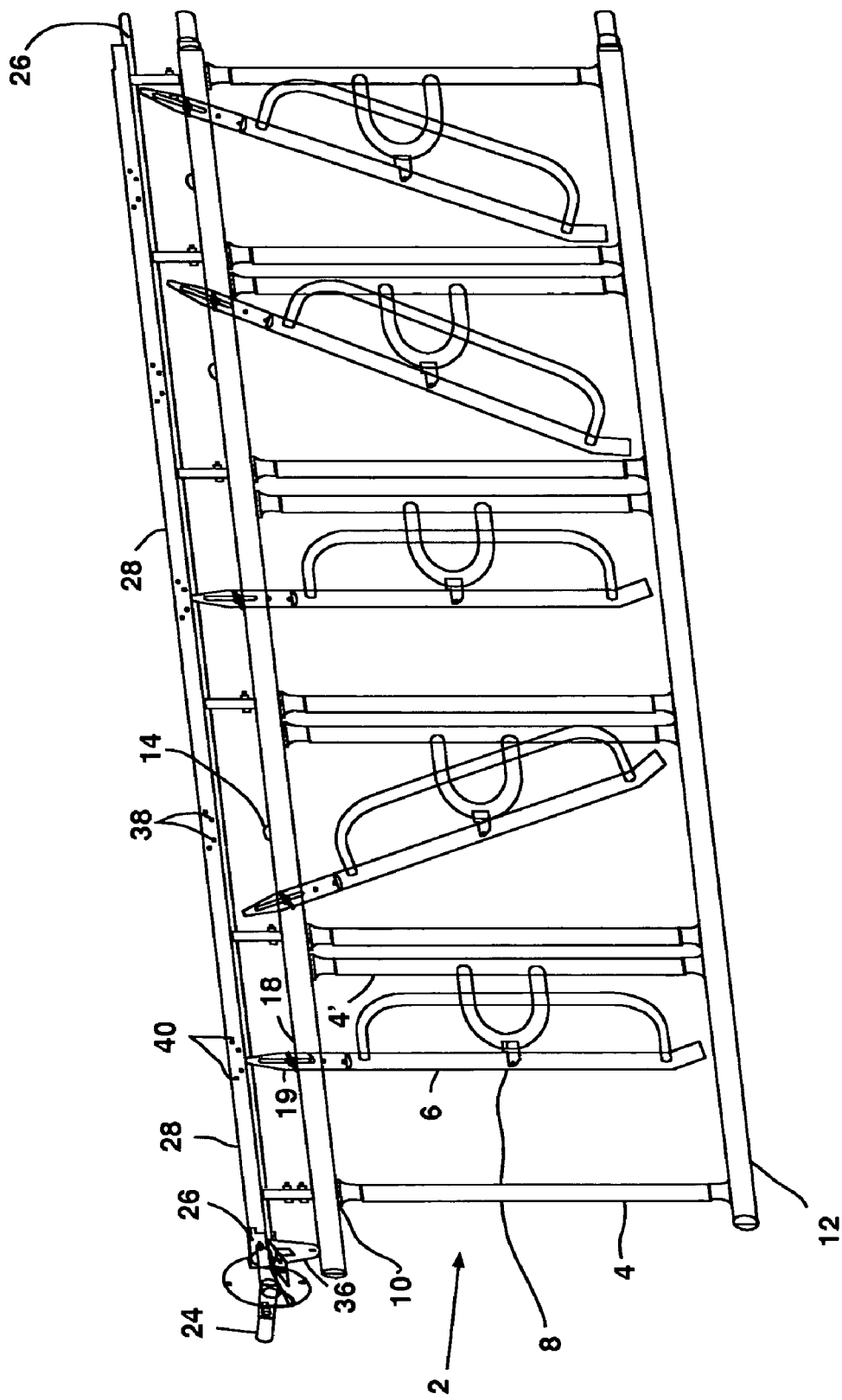
FIG. 5 is a reverse perspective view of the invention shown in FIG. 6.
Figure 6:
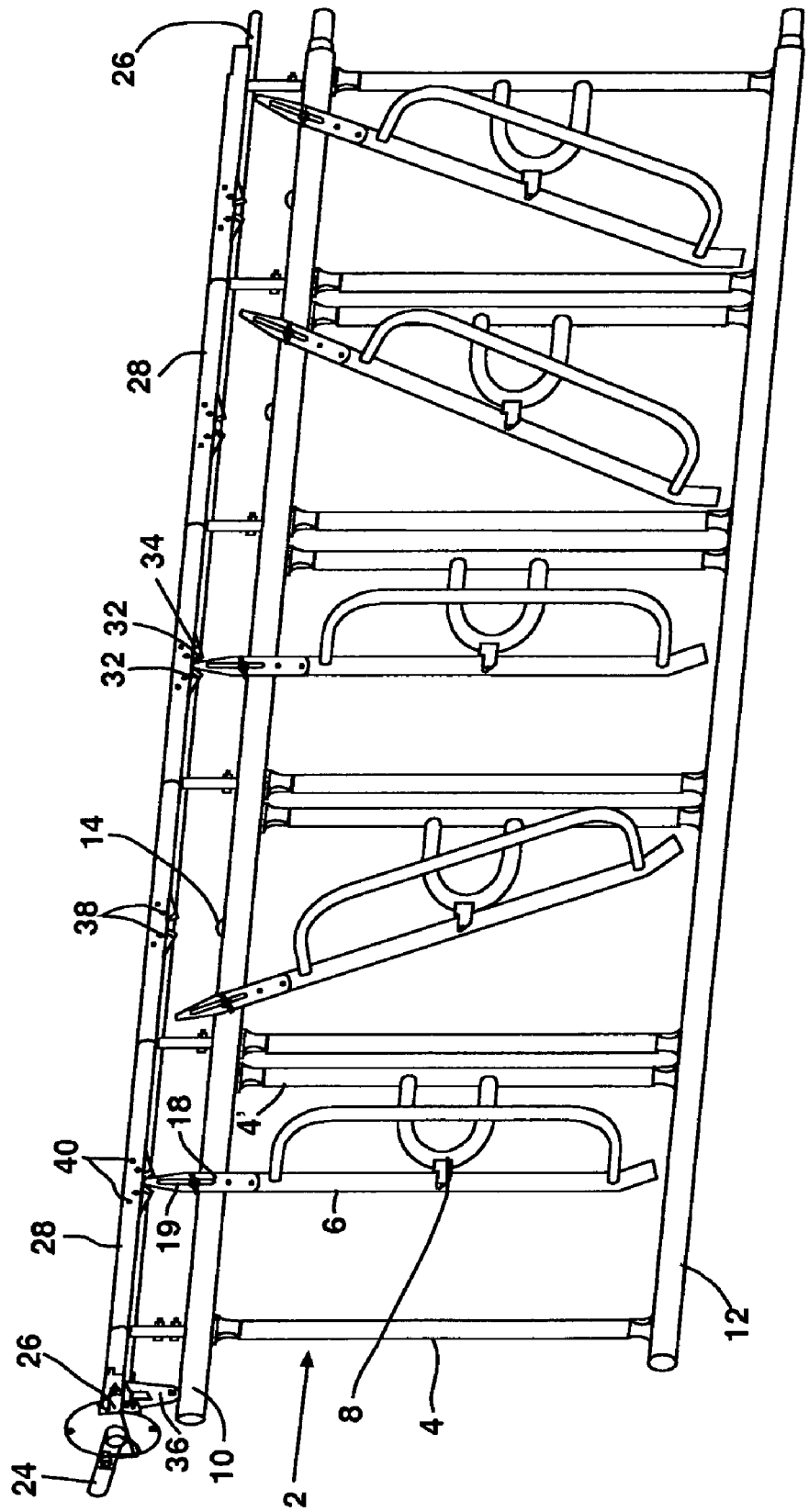
FIG. 6 is a perspective view of present invention showing two of the pivot rods in the open position.

The bottom portion of this control rod casing or sleeve 28 is generally open, or provides an opening through which the latch fingers may pass. Within each of these control rod casings or sleeves 28 a pair of bracket latching couplers or fingers 32, 34 are placed. These bracket latching couplers or fingers 32, 34 are configured so as to extend down through the bottom portion of the control rod 26 casing and to selectively engage the top portion of the stanchion latch bracket 18. The control rod 26 extends through these bracket latching couplers 32, 34 (also called latching fingers or dogs). A first set of fasteners 38, preferably rivets, connect these latching fingers 32, 34 to the inside of this sleeve 28, and a second set of fasteners 40 are used to hold the sides of the sleeve 28 near these fingers 32, 34 so as to maintain the sleeve in a desired position and relationship. The sheath 28 and control rod 26 are vertically suspended above the top rail 10 by a set of risers 22. These risers 22 are located at selected intervals so as to suspend the control rod 26 and the control rod sleeve 28 in a desired position and orientation above the top rail 10. Furthermore, a support plate 36, which provides a support position to the handle 24 of the device and the first end of the control rod 26 is also connected near the first end of such a device. If so desired, a portion of the handle 24 may be tethered to a portion of this support plate 36 so as to prevent accidental or unauthorized movement of the control rod 26. Detailed views of this preferred embodiment of the invention is shown in FIGS. 2 and 3.

The control rod 26 is made up of a piece of material that has a non-symmetrical cross section. Preferably, this rod 26 has a generally D-shaped cross section. This D shaped control rod 26 extends through all of the sheath sections and extends from a first end, which is connected to a handle 24 to a second end along a length. This control rod 26 is suspended within the control rod sleeve 28 and passes between the sets of latching fingers 32, 34. When the control rod 26 is rotated, the generally oblong shape of the control rod 26 interacts with the latching fingers 32,34 and pushes the pairs of fingers away from each other. When this occurs, these fingers 32,34 are released from interaction with the stanchion latch bracket 18 and the pivoting stanchion arm 6, to which the stanchion latch bracket 18 is attached and allowed to move. In this configuration, all of the pivoting stanchion arms 6 are positioned in an open position unless individually selected to be closed by inserting the manual catch pin 16 through the slots in the stanchion latch bracket 18 and the rail bracket 14.

Similarly, when these pivoting stanchion arms 6 are placed in a generally upright position, the control rod 26 can be rotated so as to allow the latch fingers 32, 34 to be positioned closer together and for these latch fingers 32, 34 to interact with the stanchion latch bracket 18 so as to hold the pivoting stanchion arms 6 in a locked position.

The control rod 26 is configured to both rotate within the sheath 28 as well as to slide along the longitudinal axis of the rod 26 within the sheath 28. Contrary to other prior art embodiments wherein the pivoting arms 6 were configured to interact with a portion of a control rod 26 directly, and where temperature fluctuation causes variation of the longitudinal positioning of the connection portions of the control rod 26, the control rod in the present invention is relatively smooth thus allowing for expansion and contraction of the rod with little to no effect upon the position or functioning of the latching mechanisms of the device.

In the preferred embodiment of the invention, the control rod 26 runs through a sheath or sleeve 28 which is preferably made from a different type of material such as a type of folded sheet metal. This sheath or sleeve 28 is preferably made of interconnected sections of approximately 30-40 inches which are interconnected by fastening devices such as rivets. The sheath portion 28 is mounted in a position whereby the top portion of stanchion latch bracket 18 is able to make contact with and to be held by the latch fingers 30. It is also in a desired position wherein rotational movement of the control rod 26 relative to the latch fingers 32,34 causes these latch fingers 32,34 to be pushed a sufficient distance whereby interaction between the latch fingers 32,34 and the top portion of the stanchion latch bracket 18 is terminated and the pivoting stanchion arm 6 is released.

This release may be accomplished irrespective of the longitudinal position of the control rod 26 relative to the latch fingers 32,34. The control rod 26 has no direct, fixed connection with the latch block, the sleeve 28, the latch fingers 32,34, and as such can both rotate as well as slide through this portion of the device. Expansion and contraction of the control rod 26 because of temperature variations has little or no effect upon the function of the device.

Furthermore, because the sheath sections 28 are spatially interconnected, and the latch blocks which contain the latch fingers 32,34 are independently connected within the sheath sections 28, temperature gradients and variations are absorbed within the individual pieces themselves and are not transmitted and passed on. This results in the individual pieces of the latching devices 32, 34 being left in the proper position to latch and hold the pivoting stanchion bar 6 when so desired. This allows the entire section to be released by the single turning of the control rod 26, which in turn acts upon the individual pieces of the latching devices 32, 34 so as to raise these pieces and thus allow the pivoting stanchion arm 6 to pivot. When the control rod 26 is rotated in a different direction, the latching devices 32, 34 are lowered so as to interact and hold the top portion of the pivot bar 6 in place and the device is then locked.

In addition, when an operator so desires, individual pivot rods 6 of particular stanchions can be locked so that use of the control rod 26 will have no effect upon the function of these devices. This is done by inserting manual latch pins 16 through the elongated slots 19 which are formed within the stanchion latch bracket 18, as well as through the rail bracket 14 which is located upon the top rail 10 of the device. When pivotal movement of these pivoting stanchion arms 6 is later desired, removing the catch pin 16 from its position within the stanchion latch bracket 18 will enable this to take place.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. In an assembly of animal stanchions including fixed stanchions and pivoting stanchions laterally spaced apart and connected to a mounting connection device so as to allow said pivoting stanchions to be moved between an open position in which an upper part of a head opening is enlarged to enable an animal to place its head through the opening, to a closed position in which the upper part of the opening is narrowed to hold the animal's head between the fixed stanchion and the pivoting stanchion, said pivoting stanchion being supported and arranged to fall into said open position when released from a latching mechanism, said latching mechanism comprising:

a first latching device attached to a fixed structure and configured to receive and releasably hold a portion connected to said pivoting stanchion therein;

a second latching device fixedly connected to said pivoting stanchion, said second latching device configured to interact with said first latching device so as to secure and releasably hold said pivoting stanchion in a desired vertical orientation, said second latching device also defining an elongated slot therein, said elongated slot configured to receive a portion of a manual catch pin therein;

a control device configured to selectively engage and disengage said first and second latching devices so as to alternatively restrain or allow movement of said pivoting stanchion, said control device comprised of a control rod positioned within a control rod sleeve in such a way so as to allow rotational and longitudinal movement of said control rod within said control rod sleeve.

2. The latching mechanism of claim 1 wherein said control rod has a smooth, uniform cross section.

3. The latching mechanism of claim 1 wherein said control rod has a generally asymmetrical cross-section.

4. The latching mechanism of claim 1 wherein said control rod sleeve has an open bottom portion.

5. The latching mechanism of claim 1 wherein said control rod sleeve is made up of a plurality of interconnected sections which are held together by fasteners.

6. The latching mechanism of claim 1 wherein said first latching device is connected to the inside of said control rod sleeve by fasteners.

7. The latching mechanism of claim 1 wherein said first latching device is comprised of at least two latch fingers connected within said control sleeve by fasteners, said latch fingers configured to hold and interact with a portion of said second latching device.

8. The latching mechanism of claim 7 wherein said second latching device is a stanchion latch bracket, said stanchion latch bracket fixedly connected to said pivoting stanchion, said stanchion latch bracket having a portion configured to connect with said latch fingers so as to hold said pivoting stanchion in a desired position.

9. The latching mechanism of claim 7 wherein said first latching device also includes a second set of latching fingers which are configured within said sleeve so as to selectively releasably hold a portion of said second latching device.

10. The latching mechanism of claim 1 further comprising a system for individually locking said pivoting stanchion arms so as to prevent movement of said pivoting stanchion arms regardless of the movement of the control rod.

11. In an assembly of animal stanchions including fixed stanchions and pivoting stanchions laterally spaced apart and connected to a mounting connection device so as to allow said pivoting stanchions to be moved between an open position in which an upper part of a head opening is enlarged to enable an animal to place its head through the opening, to a closed position in which the upper part of the opening is narrowed to hold the animal's head between the fixed stanchion and the pivoting stanchion, said pivoting stanchion being supported and arranged to fall into said open position when released from a latching mechanism, said latching mechanism comprising:

a generally smooth control rod having an asymmetrical cross-section, said control rod slideably and rotatably connected within a control sleeve;

said control sleeve made up of a plurality of interconnected sections that define at least one opening defined in the bottom of said control sleeve, said control sleeve also having a plurality of latching devices attached thereto said latching devices configured to interact with said generally smooth control rod so as to allow a portion of one of these latching devices to be raised or lowered so as to selectively engage or disengage with a compatibly configured second latching device that is configured and connected to a pivoting stanchion;

said compatibly configured second latching device configured and connected to one of said pivoting stanchions, said second latching device configured to interact with a portion of said first latching device so as to secure and releasably hold said pivoting stanchion in a desired vertical orientation, said second latching device also defining an elongated slot therein, said elongated slot configured to receive a portion of a manual catch pin therein.

12. The latching mechanism of claim 1 wherein said control rod has a generally D-shaped cross-section.

13. The latching mechanism of claim 1 wherein said first latching device is slideably connected within said control sleeve by fasteners.

14. The latching mechanism of claim 11 wherein said first latching device is comprised of at least two latch fingers connected within said control sleeve by fasteners, said latch fingers configured to interact and hold a portion of said second latching device.

15. The latching mechanism of claim 14 wherein said second latching device is a stanchion latch bracket, said stanchion latch bracket fixedly connected to said pivoting stanchion, said stanchion latch bracket having a portion configured to connect with said latch fingers so as to hold said pivoting stanchion in a desired position.

16. The latching mechanism of claim 14 wherein said first latching device also includes a second set of latching fingers which are configured within said sleeve so as to selectively releasably hold a portion of said second latching device.

17. The latching mechanism of claim 14 further comprising a system for individually locking said pivoting stanchion arms so as to prevent movement of said pivoting stanchion arms regardless of the movement of the control rod.

\* \* \* \* \*